United States Patent
Satoh et al.

(10) Patent No.: US 6,382,499 B1
(45) Date of Patent: *May 7, 2002

(54) ULTRASONIC BONDING PERFORMING METHOD AND METHOD FOR TRANSFORMING, RETAINING AND RELEASING A SUSPENSION ASSEMBLY

(75) Inventors: Takuya Satoh, Hayama-machi; Tatsushi Yoshida, Chigasaki; Tatsumi Tsuchiya, Ayase; Naoki Kurosu, Fujisawa, all of (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,361

(22) Filed: Aug. 26, 1998

(30) Foreign Application Priority Data

Sep. 26, 1997 (JP) .............................................. 9-261523

(51) Int. Cl.[7] ........................... B21D 39/00; B23K 1/06; G11B 5/127; G11B 5/48
(52) U.S. Cl. ................................ 228/173.1; 228/110.1; 29/603.03; 29/603.06; 360/104
(58) Field of Search ........................... 228/173.1, 110.1; 360/104, 103; 29/603.01, 603.02, 603.03, 603.04, 603.06, 603.19

(56) References Cited

U.S. PATENT DOCUMENTS

| | | | | |
|---|---|---|---|---|
| 4,077,115 A | * | 3/1978 | Kadar et al. ................... 29/630 |
| 4,759,119 A | * | 7/1988 | Noguchi et al. ............... 29/603 |
| 5,035,044 A | * | 7/1991 | Toensing ..................... 29/603 |
| 5,277,356 A | * | 1/1994 | Kawauchi ................... 228/111 |
| 5,645,735 A | * | 7/1997 | Bennin et al. ................. 216/22 |
| 5,661,896 A | * | 9/1997 | Erpelding ................. 29/603.01 |
| 5,717,547 A | * | 2/1998 | Young ......................... 360/104 |
| 5,742,996 A | * | 4/1998 | Frater et al. ............. 29/603.06 |
| 5,748,412 A | * | 5/1998 | Murdock et al. ........... 360/113 |
| 5,757,585 A | * | 5/1998 | Aoyagi et al. .............. 360/104 |
| 5,758,406 A | * | 6/1998 | Hunsaker et al. ........ 29/603.06 |
| 5,870,258 A | * | 2/1999 | Khan et al. ................. 360/104 |
| 5,873,159 A | * | 2/1999 | Arya et al. .............. 29/603.03 |
| 5,892,637 A | * | 4/1999 | Brooks, Jr. et al. ......... 360/104 |
| 5,896,247 A | * | 4/1999 | Pan et al. .................... 360/104 |
| 5,898,541 A | * | 4/1999 | Boutaghou et al. ......... 360/109 |
| 5,901,430 A | * | 5/1999 | Ziegler et al. ........... 29/603.06 |
| 5,930,078 A | * | 7/1999 | Albrecht et al. ............ 360/104 |
| 5,933,293 A | * | 8/1999 | Bennin ........................ 360/104 |
| 5,956,208 A | * | 9/1999 | Kawazoe .................... 360/104 |
| 5,956,209 A | * | 9/1999 | Shum ......................... 360/104 |
| 5,969,906 A | * | 10/1999 | Arya et al. .................. 360/104 |
| 5,973,882 A | * | 10/1999 | Tangren ...................... 360/104 |
| 6,021,022 A | * | 2/2000 | Himes et al. ............... 360/104 |
| 6,141,182 A | * | 10/2000 | Amemiya et al. .......... 360/104 |
| 6,321,974 B1 | * | 11/2001 | Tsuchiya et al. ......... 228/110.1 |

* cited by examiner

Primary Examiner—Tom Dunn
Assistant Examiner—L. Edmondson
(74) Attorney, Agent, or Firm—Douglas R. Millett

(57) ABSTRACT

An integrated suspension for a slider in a magnetic record system has a simplified structure relatively easy to manufacture. This new integrated suspension is assembled from separate pieces including a load beam a flexure and a mount plate. The flexure includes a flexible member and a conductive lead integrally formed thereon. Since the flexible member is of super-thin type, the flexion of the flexure is minimized by the support using a platform support in an ultrasonic bonding of its conductive lead with a bonding pad of the slider. Besides, to minimize the deflection, an ultrasonic bonding is executed in close order of distance to support portion. Furthermore, a tab extending from the tip of the load beam is used so as not to affect the flexure regarded as a fine piece.

5 Claims, 16 Drawing Sheets

[Figure 1]
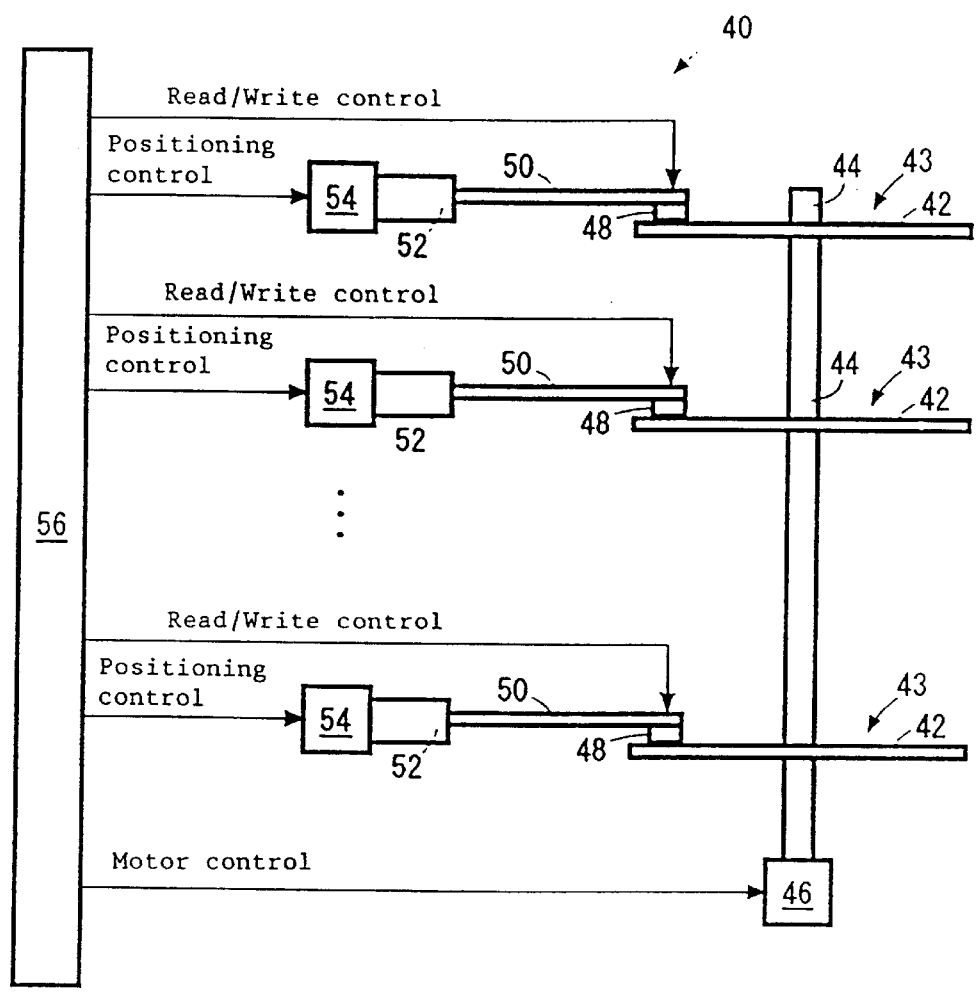

[Figure 2]
PRIOR ART
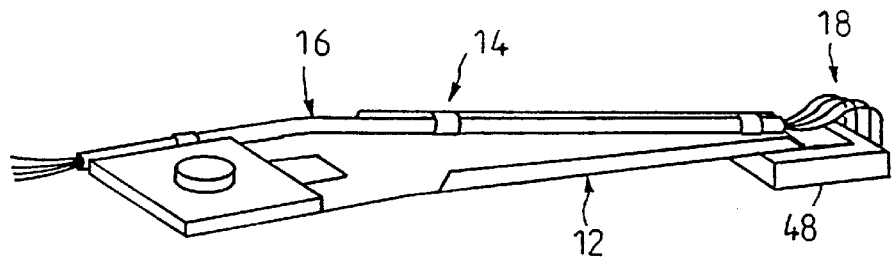
[Figure 6]
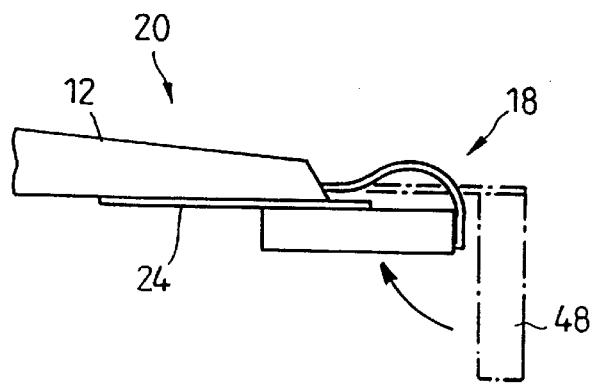
PRIOR ART

[Figure 3]
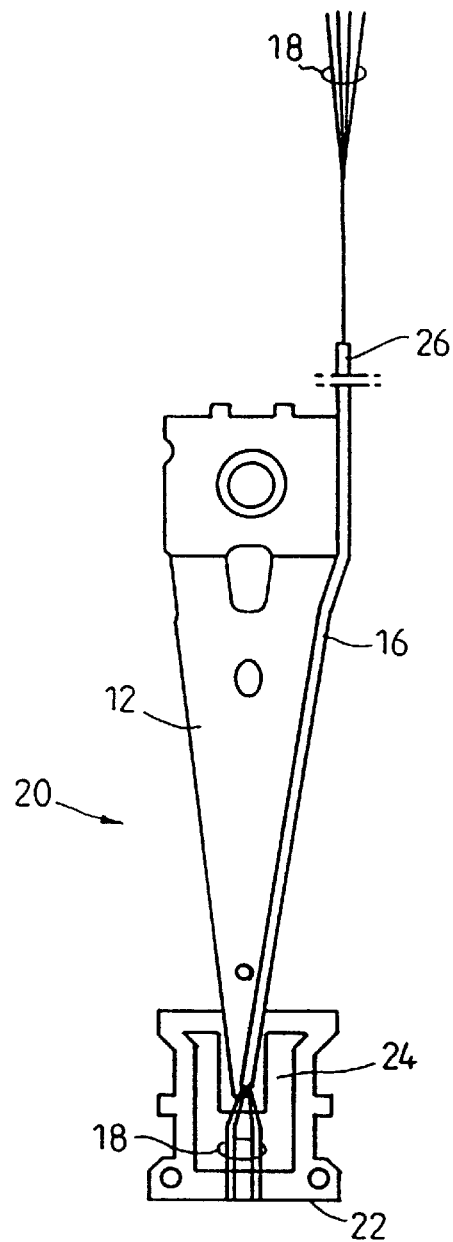
PRIOR ART

[Figure 4]
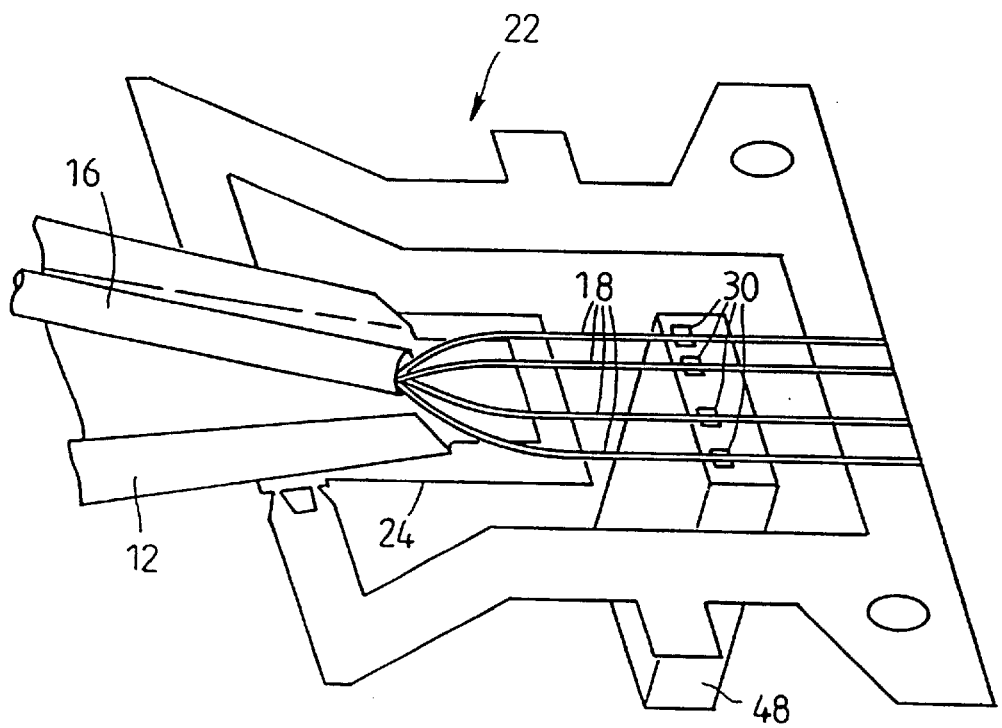
PRIOR ART

[Figure 5]
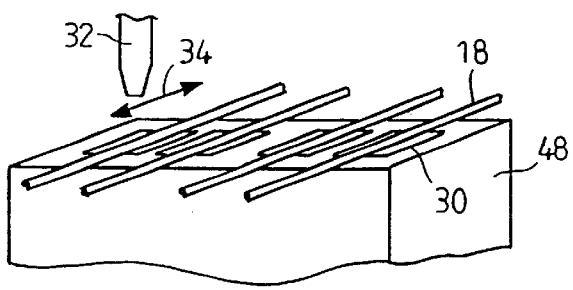
PRIOR ART
[Figure 7]
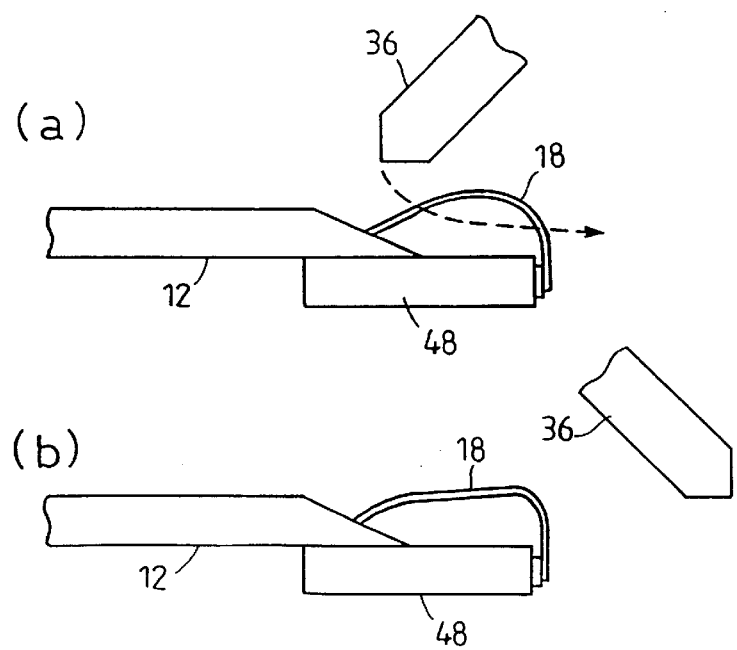

[Figure 8]
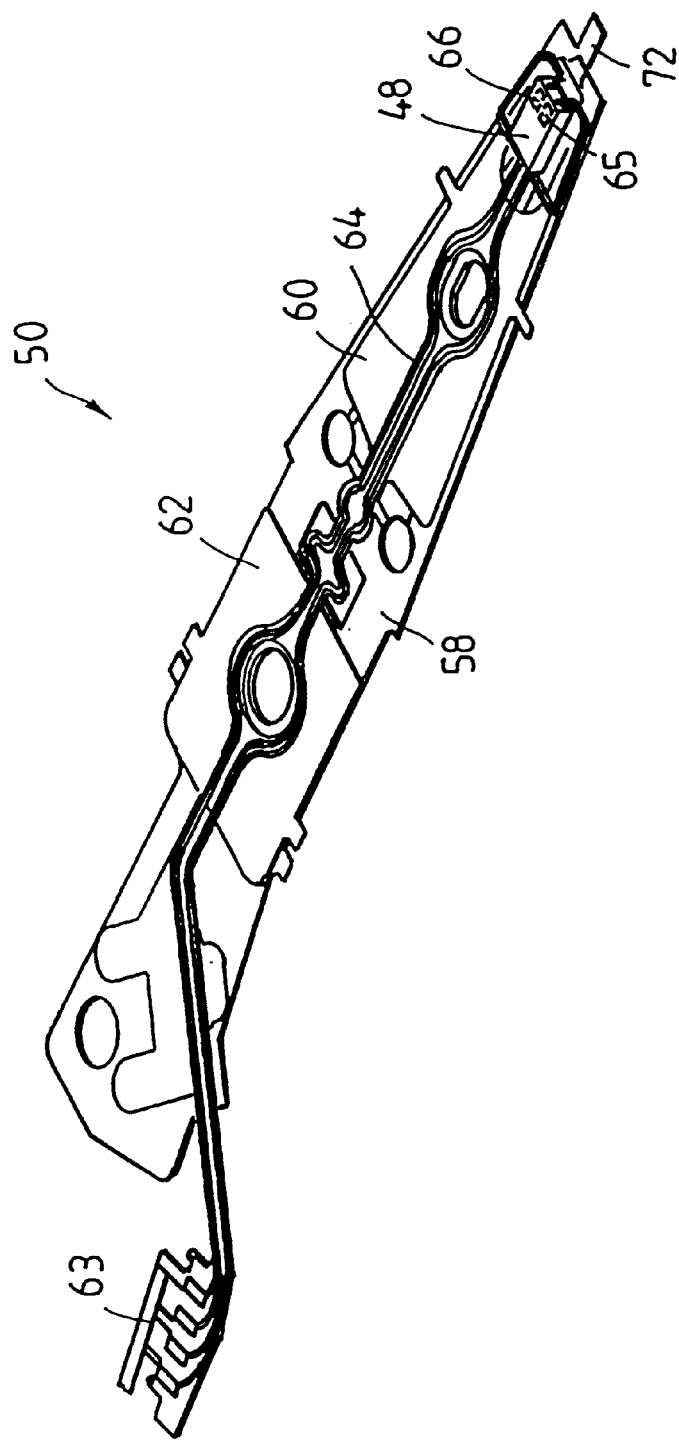

[Figure 9]
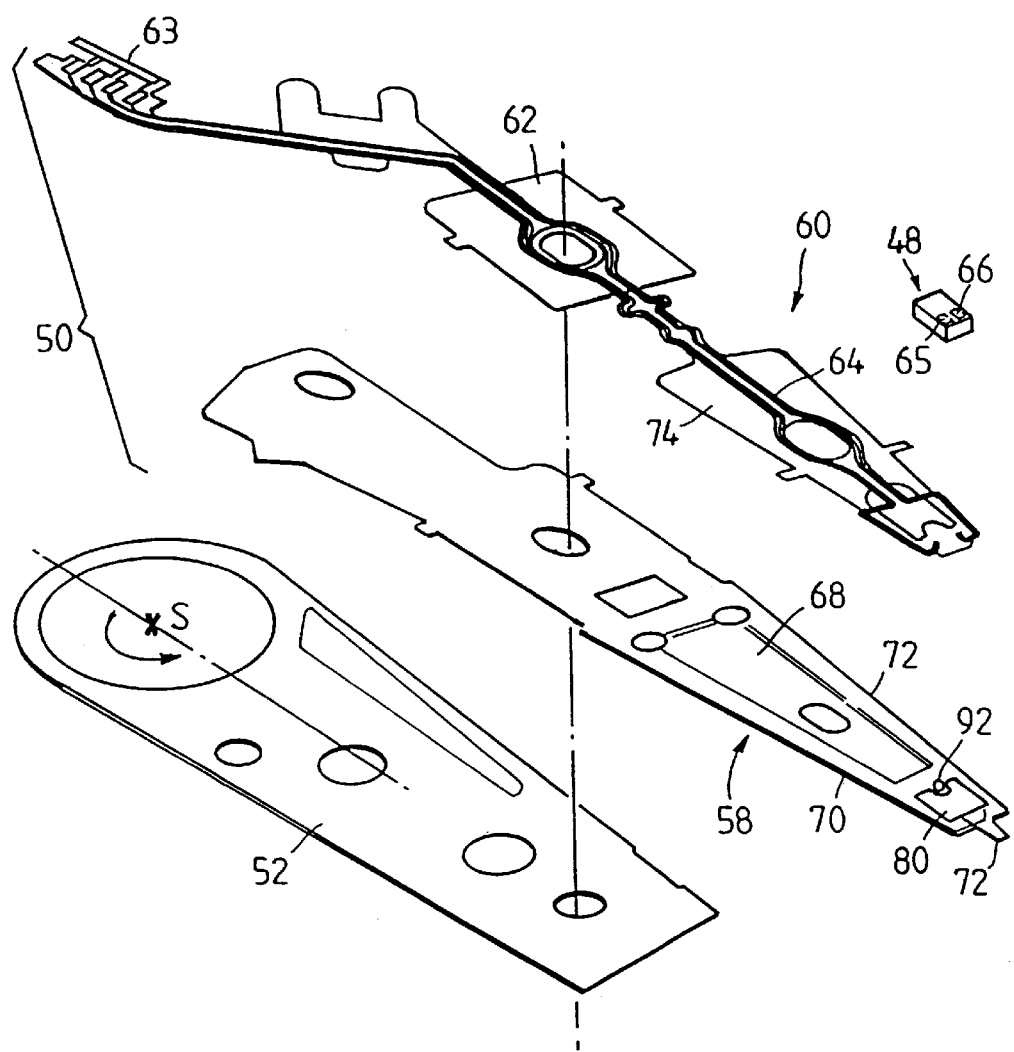

[Figure 10]
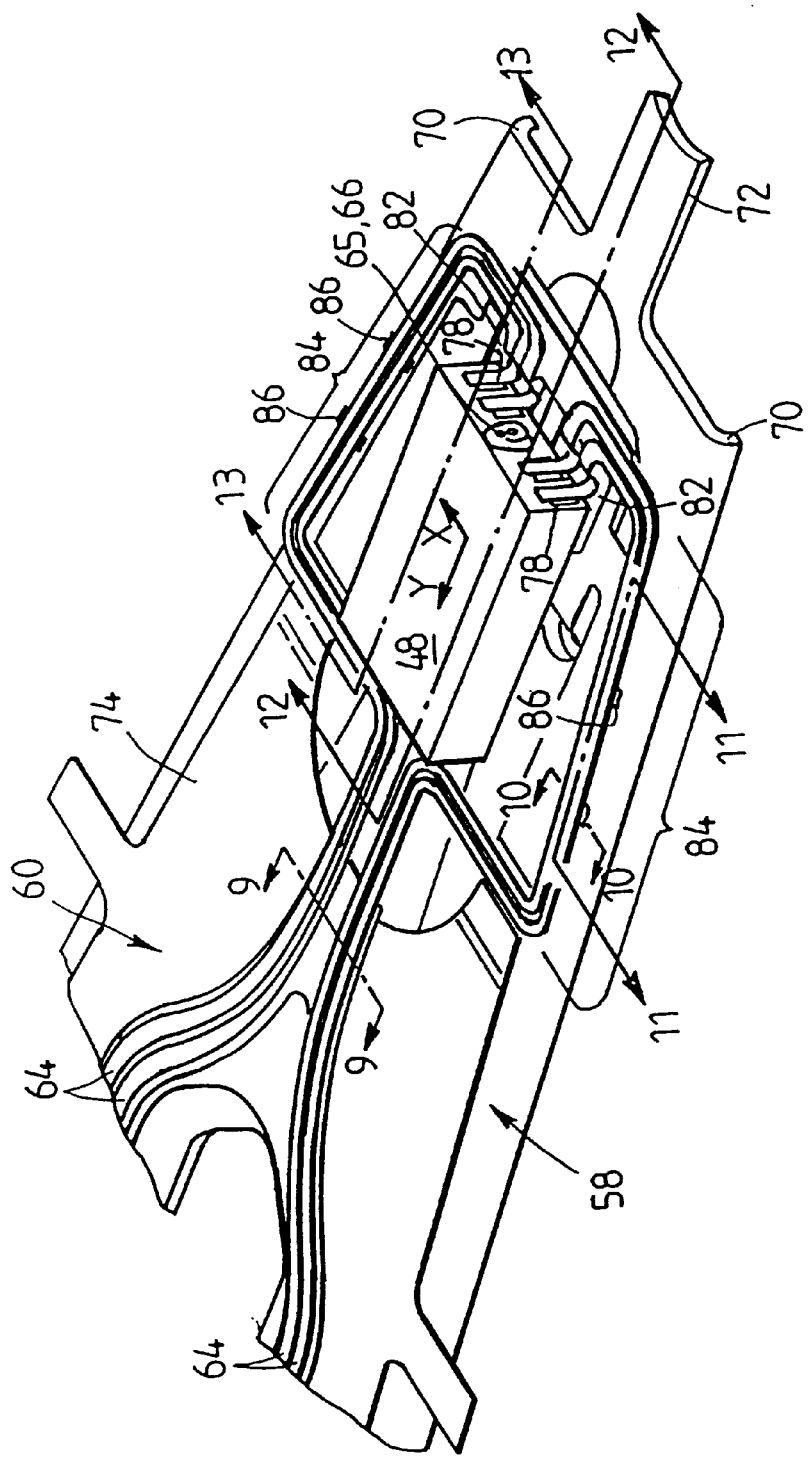

[Figure 11]
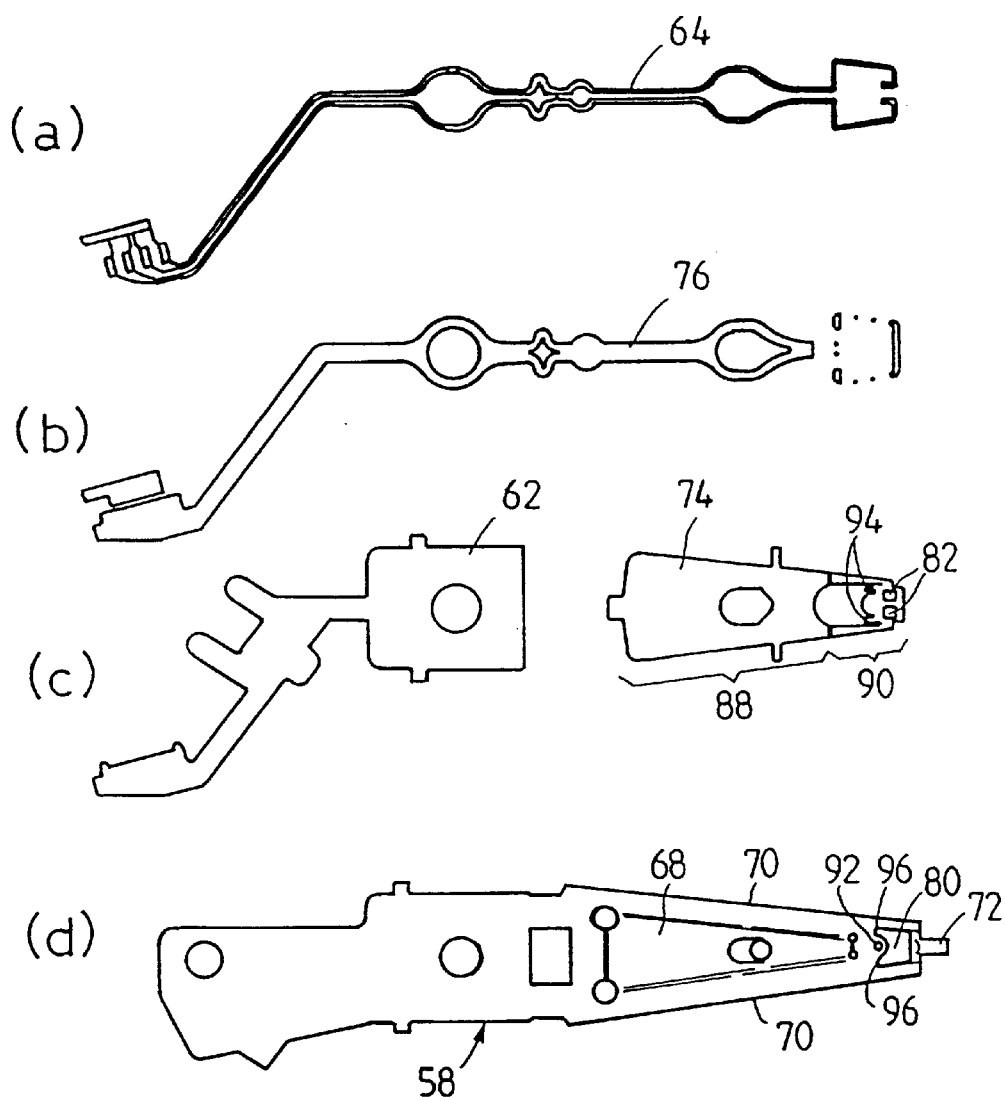

[Figure 12]
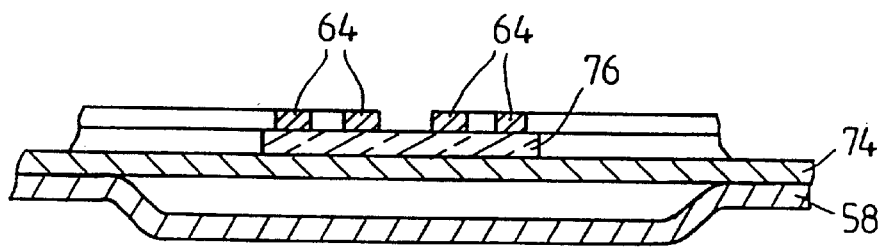
[Figure 13]
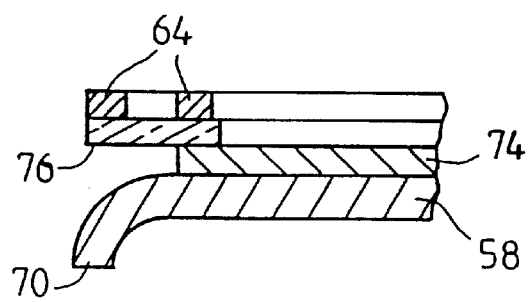
[Figure 14]
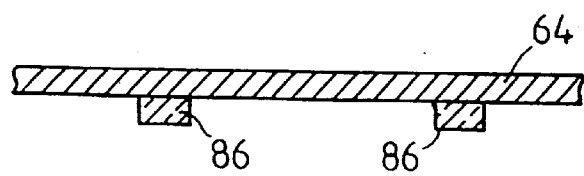

[Figure 15]
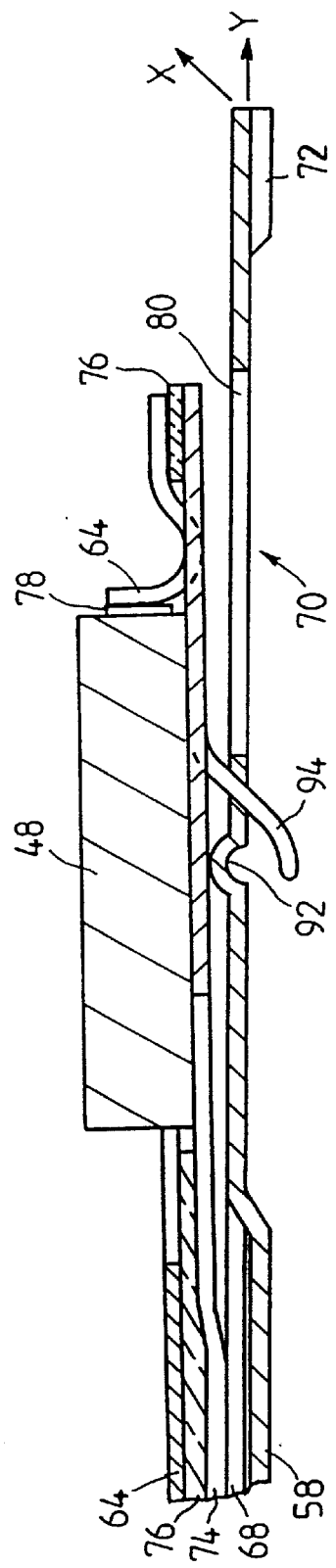

[Figure 16]
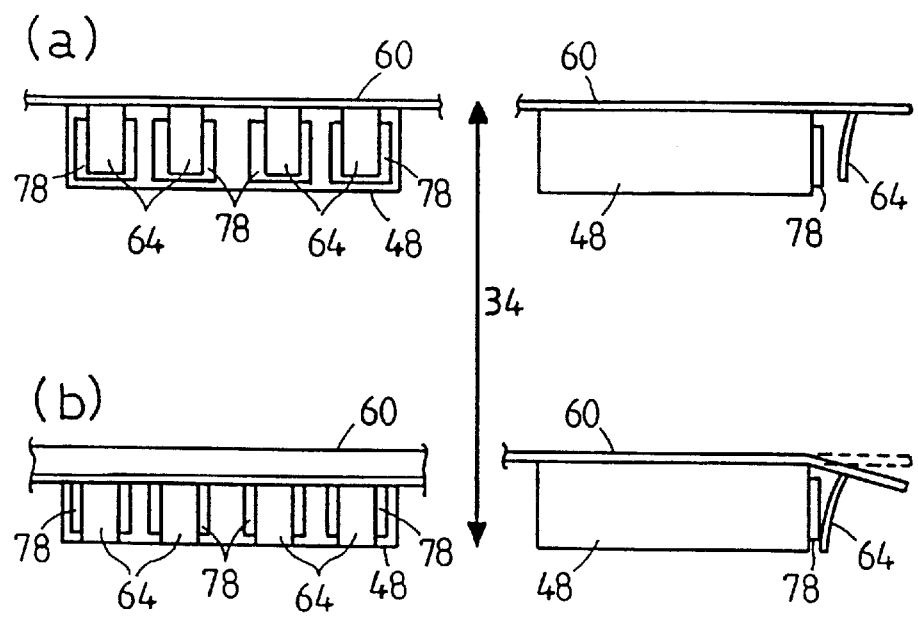
[Figure 17]
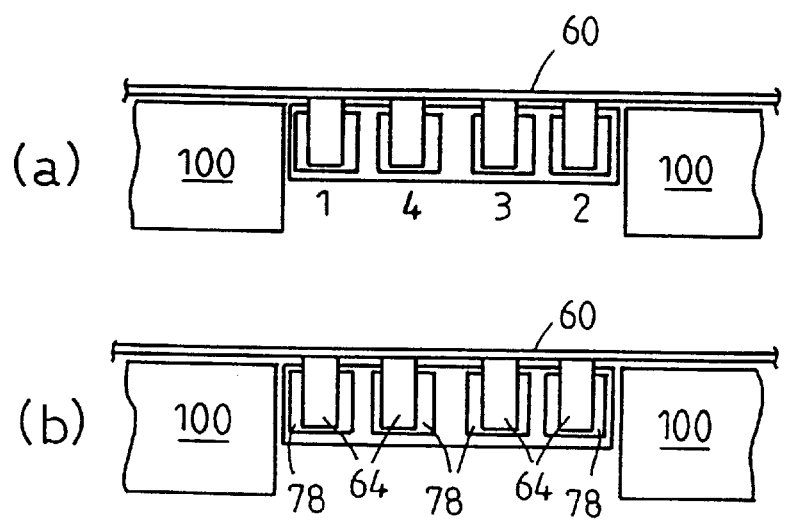

[Figure 18]
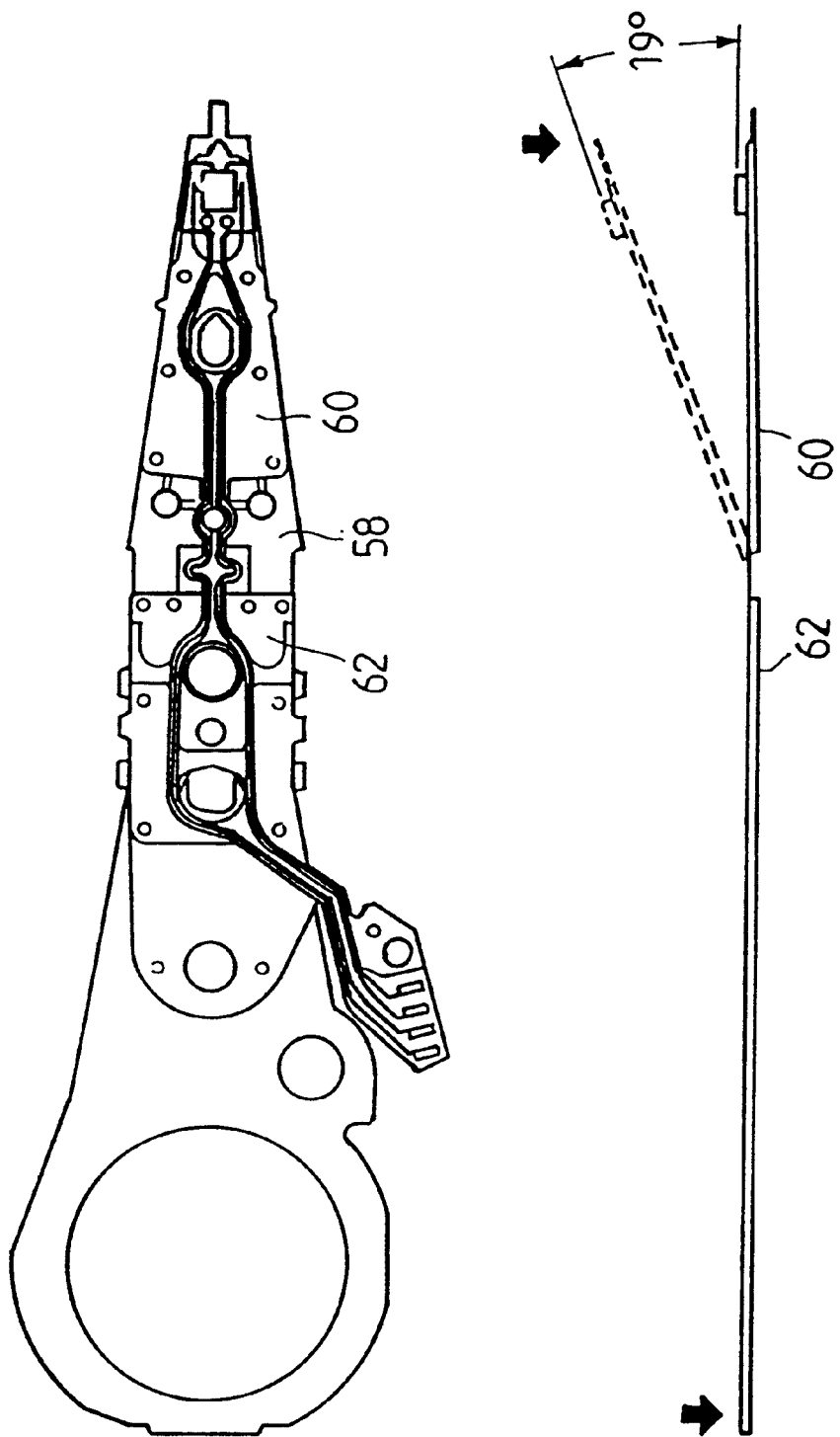

[Figure 19]
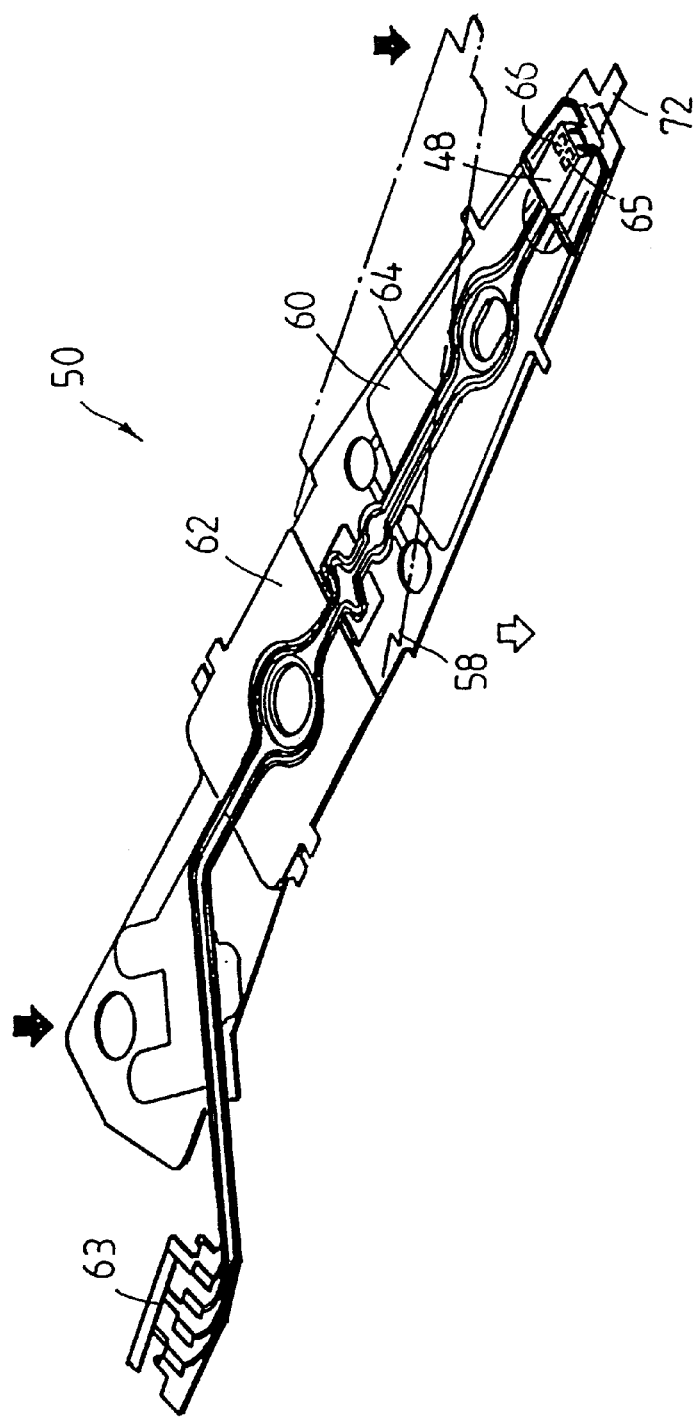

[Figure 20]
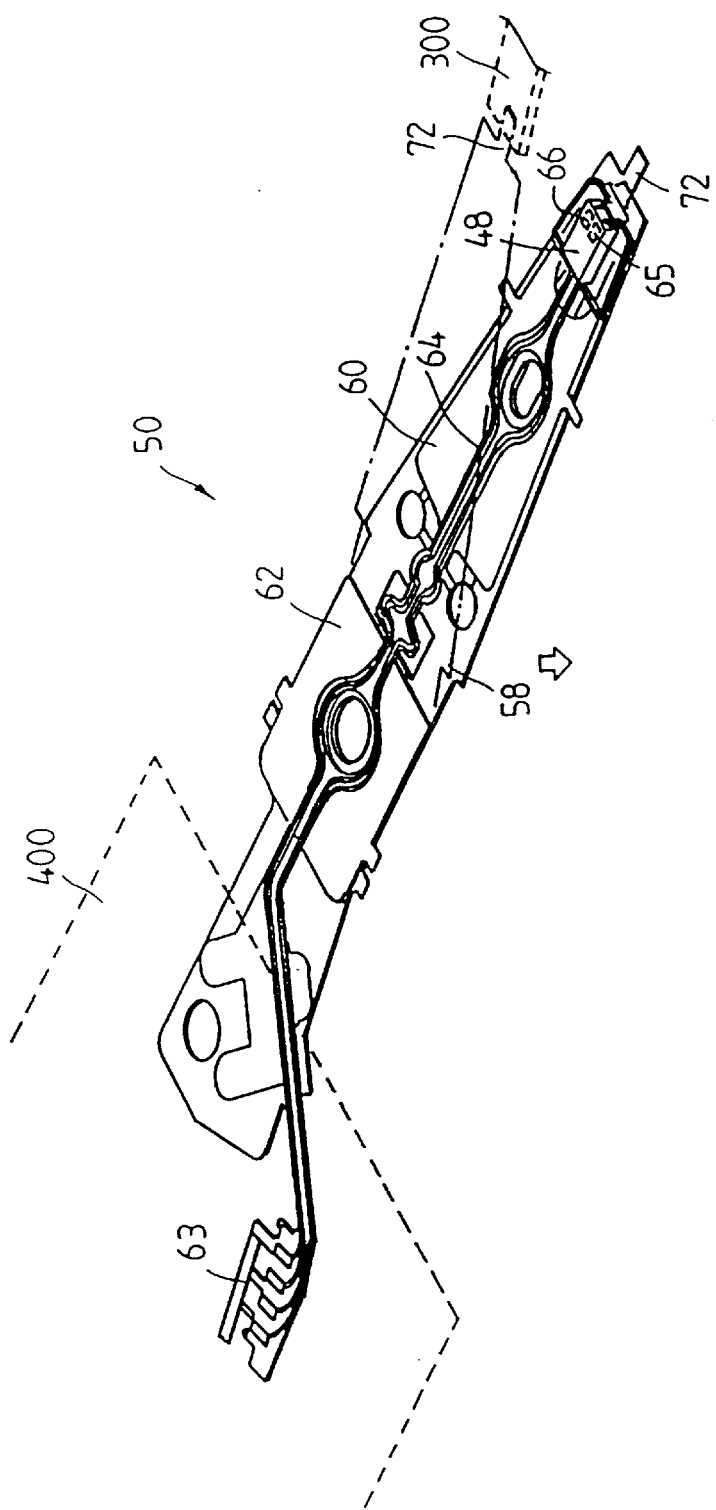

[Figure 21]
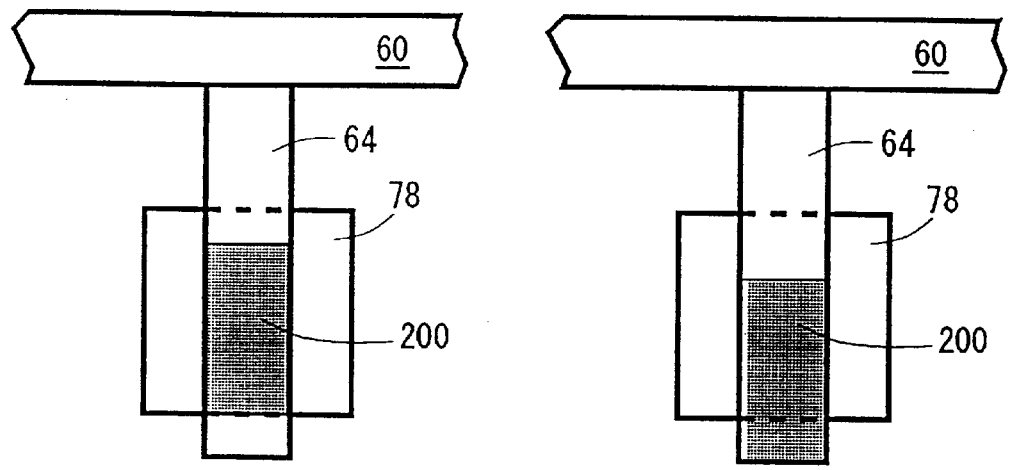
(a)   (b)
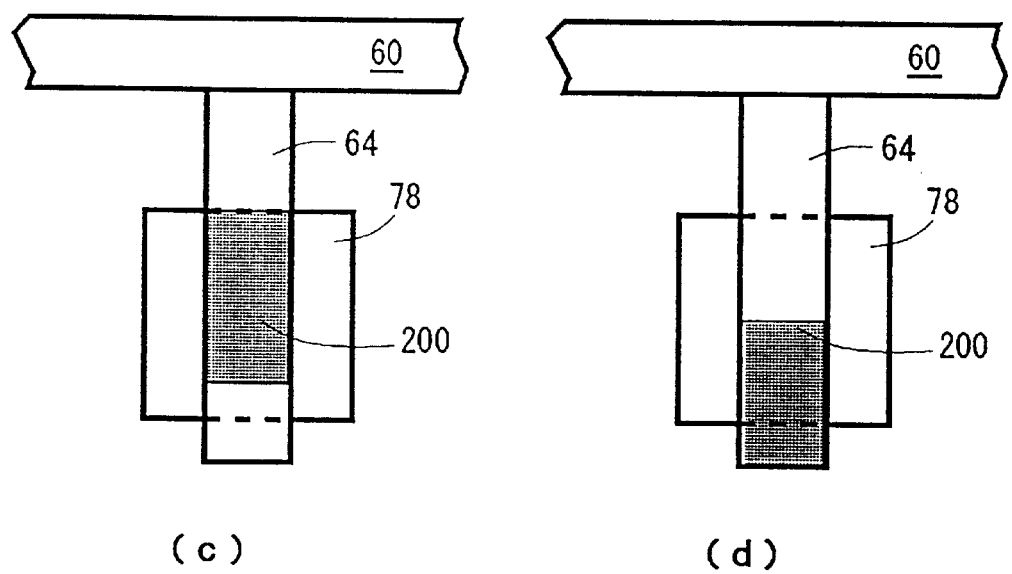
(c)   (d)

ULTRASONIC BONDING PERFORMING METHOD AND METHOD FOR TRANSFORMING, RETAINING AND RELEASING A SUSPENSION ASSEMBLY

BACKGROUND OF THE INVENTION

Field of the Invention

The present invention relates to a process for appropriately attaching a slider to a suspension assembly in a magnetic storage system and more specifically to a method for executing an ultrasonic bonding to appropriately attach a slider to a thin multi-piece integrated suspension assembly used in a small-sized magnetic disk storage system and a method for handling the suspension assembly for that purpose.

A magnetic disk drive is an information storage unit using at least one rotatable disk having concentric data tracks including information, a head (or "transducer") for reading data from or write data in these numerous tracks and a head positioning actuator connected to this head for moving the head to a desired data track and retaining the head on the center of the track during the reading or writing operation. The transducer is mounted on a air bearing slider (hereinafter, simply abbreviated to "slider") and supported near the data surface of the disk by an air cushion generated by the rotating disk. By using the suspension, the slider is mounted on the support arm of the head positioning actuator.

FIG. 1 exemplifies a schematic simplified block diagram of a magnetic disk storage system 40 including a flexure to which a slider is bonded. The magnetic disk storage system 40 comprises at least one rotatable magnetic disk 42 supported on the spindle 44 and rotated by a disk drive motor 46 and at least one slider 48 positioned near the magnetic recording medium on the disk surface 43. Data are stored on the magnetic recording medium on each disk 42 in a ring pattern format of concentric data tracks (not shown). Each slider 48 includes one or more magnetic resistor (MR) sensors and write transducers.

A slider 48 is mounted on an integrated suspension 50 and further the integrated suspension 50 is connected to actuator means 54 by using an actuator arm 52. As a disk 42 rotates, the slider 48 is so controlled by actuator means 54 as to move across means disk surface 43 and the slider 48 accesses or reads a different portion of the disk surface 43 in which desired data are recorded. The integrated suspension 50 gives such a slight spring force as to bias the slider 48 relative to the disk surface 43, thereby controlling a slight vertical elasticity of the slider 48 relative to the rotating disk surface 43. Actuator means 54 as seen in FIG. 1 is, for example, a voice coil motor (VCM). Various components of the magnetic disk storage system 40 are operatively controlled in accordance with a control signal generated by the control unit 56. For example, the operating control of various components includes positioning control of the actuator means 54, motor control of the drive motor 46 and read/write control of data.

The integrated suspension 50 does not only act to dimensionally stabilize the distance between the slider 48 and the actuator arm 52 during the relative movement on the surface of a rotating magnetic disk, but also controls such motions as "pitch and roll motions" (hereinafter, referred to as "gimbaled motions or gimbal motion"), among them especially a slight "vertical motion" of the slider 48. The "vertical motion" in the present specification is to be defined as a motion along a nearly vertical distance between the magnetic disk surface and the air bearing surface of a slider mounted on the suspension when a rotating magnetic disk surface is assumed and the "vertical direction" is to be defined as a bidirection toward the magnetic disk surface and toward the air bearing surface of a slider mounted on the suspension. It may be considered to be a direction perpendicular to the air bearing surface.

On pursuing a higher record density, a greater number of data tracks must be packed on the disk surface and the necessity of formatting the disk surface into a narrower data track or into a narrower space between data tracks is urged. To cope with such a challenge, a slider is first downsized. And, it is falling under a category of pico slider. Letting an oblong of 4 mm×2 mm be the standard slider, the pico slider means a slider corresponding to about 30% of its size (about 1.3 mm×0.5 mm). With decreasing area of the air bearing surface of a slider, a force received by the slider from a rotating magnetic disk is necessarily reduced.

Corresponding to such downsizing of a slider, a delicacy will be required concerning the suspension structure, in particular, demand for performance specification concerning a flexure becomes even stricter. Even under a strict tolerance in the alignment of a slider/track, in order that dense stacked data/tracks are accessible and a slider can accurately and repeatedly be positioned to the disk surface, the flexure of an integrated suspension should be strongly built so as to retain the flexibility and reliability even if light/thin.

Since the constitution of an integrated suspension 50 has been improved day by day and various types are present, various names are given even to components of a suspension and are mixed with each other. Accordingly, it has become difficult to precisely call individual pieces with universal names and distinguish them. As one example of constitution among downsized suspensions, however, one comprising a "load beam" mounted on the actuator arm of a head positioning actuator and a "flexure" supported on the load beam for supporting a slider can be mentioned. The "load beam" generally provides an elastic spring action for biasing a slider to the disk surface, whereas the "flexure" generally acts to provide flexibility to a slider so that the slider gets on an air cushion close to the rotating disk.

U.S. patent application Ser. No. 08/644878, entitled "A Multi-Piece Integrated Suspension Assembly for a Magnetic Storage System", filed 1996-5-10 and assigned to the same applicant as that of the present application discloses a new integrated suspension structure having such a constitution. Here, a thin flexible member and conductive leads are integrally formed. Through the presentation of the suspension structure of this U.S. patent application Ser. No. 08/644878 that has not yet publicly known at the application time of the present invention, embodiments of the present invention will be described.

Meanwhile, for comparison, a conventional suspension structure that has so far been fabricated and a bonding method of bonding pads of a slider and wires which is suitable thereto will be described over FIGS. 2 to 7. The suspension structure here is one example of joined structure of the suspension 50 and the actuator arm 52 of FIG. 1. The wires here and the conductive leads described in the present invention are different in name but identical in the function of making an electrical connection. However, the wires to which a reference is made here as background art differ from conductive leads, are coated with a tube 26 (cf. FIG. 3) for insulation as a separate single piece and are not integrated with a flexible member unlike the present invention.

FIG. 2 is a perspective view showing a conventional head suspension assembly. This head suspension assembly includes a slider 48 and a suspension assembly 12 and a wire assembly 16 and a construction that the wires are retained by caulking at the site 14 is adopted.

FIG. 3 is a plan view showing a wired suspension assembly 20 of background art with a tab structure 22 extending from the suspension assembly 12 provided in consideration of convenience for ultrasonic bonding. This is disclosed in JA 995078 of patent application No. 7-264413 assigned to the same applicant as that of the present application. In this aspect, wires are already stretched and mounted on a suspension assembly. In FIG. 3, however, a slider 48 is not yet mounted unlike FIG. 2 and no slider cannot be seen in FIG. 3. Accordingly, the process of mounting/bonding of a slider will be described.

As shown in FIG. 4, when wires 18 are bridged over a tab 22 and established on a plane parallel to the suspension assembly 12 in a bondable manner, the bonding pads 30 of the slider 48 are established in a manner nearly parallel to the surface of the suspension assembly. As shown in FIG. 5, an ultrasonic bonding tool 32 is also allowed to touch the wires so that the tool surface is nearly parallel to the plane made by these wires, to which a vibration is given almost along a direction 34 in length of the wires. And, after the ultrasonic bonding, the slider is rotated by 90° and bonded to the flexure 24 as shown in FIG. 6. In this method, however, something inconvenient occurs. By bending of 90° rotation, an excessive portion (wire loop) of the wires 18 appears.

When excessive wires appear, operation of forming the wires 18 becomes necessary. That is because individual wires tend to be stabilized by their (respective convenient) ways of bending and these wires, in general, are not aligned in a uniform way of bending, which tendency exerts a bad influence on various sides. One kind of plastic deformation of wires, e.g., residual stress of wires affect badly. From such a point of view, it is found favorable for the wires 18 that the bondable parts are given by a necessary minimum distance.

Besides, special caution has been demanded for applying a caulking 14 as seen in FIG. 2. This is because wires are excessively pulled in caulking and the effect of pulling reaches the bonded site in the end of the wires. From these, a devise to keep the caulking site 14 apart from the end (portion 18 of wires) is seen. On the other hand, when an attempt is made to keep the caulking site sufficiently distant, there is a possibility of wires to move of itself in the portion to the caulking 14 and this time there is an adverse circumstance that a bad influence arises from another side.

Furthermore, in cases where the whole disk drive system becomes thinner and a stack of integrated suspensions is given to a plurality of disks, it is required to successfully fulfill a mutual connection of leads and a mutual connection of flex cables from the control electronics circuit of a disk drive system and accordingly the need for the adaptation of a vertical height in the stack of actuators occurs.

It follows also from these that the forming of wires is important. That is, the forming of wires becomes important especially as post-process operation for equalizing the way of bending individual wires as well as for confining the extent of individual bends of these wires within a predetermined vertical height. From a change from (a) to (b) of FIG. 7, one approach of forming would be visually understood. Here, by using a forming tool 36 to apply an external force to a wire, the wire loops are evened up.

To improve the mounting manner (attitude) of mounting a slider 48 on the suspension assembly 12 and also to mount a slider 48 on the suspension assembly 12 with so good precision as to maintain a suitable "static attitude" when the slider 48 is floating over the surface 43 of the rotating disk 42 for a final product, such an operation of forming is important. This is because, if the bending way of individual wires is uneven, the residual stress of wires might cause the static attitude of the slider to be twisted and further a bad effect might appear on the static attitude of the slider later.

Heretofore, methods for bonding a slider to a suspension structure in the background art were described, but as the slider and the suspension structure become super-small and super-fine as with the suspension structure of U.S. patent application No. 08/644878, it becomes difficult to execute the very operation of forming and a proper manufacturing and handling method fit for such a peculiar structure becomes necessary.

It is one object of the present invention to provide a method for performing an ultrasonic bonding of a slider which is suitable to a simplified and new integrated suspension structure relatively easy to manufacture and a handling method for the same.

SUMMARY OF THE INVENTION

According to the present invention, a method for performing ultrasonic bonding to a flexure so as to electrically connect a plurality of conductive leads and a plurality of bonding pads of a slider, the flexure including a flexible member and the conductive leads integrally formed thereon, is disclosed which comprises the steps of: positioning bondable parts of the conductive leads to the bonding pads of the slider corresponding to the conductive leads; supporting a part of the flexure close to the bondable parts of the conductive leads so as to restrict a vertical motion of the flexure; and performing ultrasonic bonding between the bondable parts of the conductive leads and the bonding pads of the slider in close order of distance to any of said supported part.

In addition, according to the present invention, a method for transforming, retaining the transformation of and releasing the transformation of a suspension assembly includes a load beam permanently bent at a predetermined part with a predetermined angle and a flexure fixedly attached to a section of the load beam, the load beam having a tab extending beyond the flexure is disclosed which comprises the steps of: applying an external force to the suspension assembly so as to transform in a different angle from the predetermined angle; retaining the transformation of the suspension assembly at the different angle; and releasing the suspension assembly from the retaining the transformation of the suspension assembly, without supporting the flexure, but with supporting the tab of the load beam.

For a fuller understanding of the nature and advantages of the present invention, reference should be made to the following detailed description taken in conjunction with the accompanying drawings.

BRIEF DESCRIPTION OF THE DRAWINGS

FIG. 1 is a schematic block diagram of a magnetic disk storage system wherein an integrated suspension according to the present invention is implemented;

FIG. 2 is a perspective view showing a head suspension assembly according to the background art;

FIG. 3 is a plan view showing a wired suspension assembly according to the background art;

FIG. 4 is a perspective view showing the ultrasonic bonding of a slider to a wired suspension assembly according to the background art;

FIG. 5 is a perspective view showing the ultrasonic bonding of a slider to a wired suspension assembly according to the background art;

FIG. 6 is a side view showing the mounting of a slider to a suspension assembly according to the background art after the ultrasonic bonding;

FIG. 7 is an illustration of the forming operation using a forming tool according to the present invention;

FIG. 8 is a perspective view of an integrated suspension used in one embodiment of the present invention;

FIG. 9 is an exploded perspective view of an integrated suspension assembly including the integrated suspension of FIG. 8;

FIG. 10 is a perspective view of the slider region of the integrated suspension of FIG. 8;

FIG. 11 is an exploded plan view showing the sequence (a)–(d) of a load beam and different layers of a flexure in the integrated suspension of FIG. 8;

FIG. 12 is a sectional view taken along line 9—9 of FIG. 10;

FIG. 13 is a sectional view taken along line 10—10 of FIG. 10;

FIG. 14 is a sectional view taken along line 11—11 of FIG. 10;

FIG. 15 is a sectional view taken along line 12—12 of FIG. 10;

FIG. 16 is an illustration of situations (a) before and (b) after the ultrasonic bonding of a slider to an integrated suspension;

FIG. 17 is an illustration of situations (a) before and (b) after the ultrasonic bonding of a slider to an integrated suspension using a platform support;

FIG. 18 is an illustration of an integrated suspension assembly which is bent so as to cause a bias force;

FIG. 19 is a perspective view showing the external force to cause a transformation to the bent integrated suspension;

FIG. 20 is a perspective view showing the situation of releasing the external force applied to the bent integrated suspension while supporting the integrated suspension; and FIG. 21 is plan views showing the situations (a)–(d) of positioning a bonding tool to a bonding pad and a conductive lead.

DESCRIPTION OF THE PREFERRED EMBODIMENT

Example of Structure of an Integrated Suspension Assembly Suitable to the Manufacturing Handling Method of the Present Invention FIG. 8 is a perspective view of a multi-piece integrated suspension assembly 50 according to one embodiment of the present invention. FIG. 9 is an exploded perspective view of main components making up an integrated suspension assembly 50 and an actuator arm 52 which to mount this integrated suspension assembly on. FIGS. 8 to 15 show a suspension similar to that shown in U.S. patent application Ser. No. 08/644878, entitled "A Multi-Piece Integrated Suspension Assembly for a Magnetic Storage System".

The actuator arm 52 is pivoted rotatably around the shaft S of a spindle (not shown) of actuator means 54 in a disk drive system 40. The main pieces of the integrated suspension 50 includes a load beam 58, a flexure 60 and a mount plate 62. One end of the load beam 58 is fixedly mounted on the actuator arm 52 by using the mount plate 62, whereas the other end of the load beam 58 supports the flexure 60 on its surface. The flexure 60 has an integrated conductive lead 64 or an integrated conductive trace on its surface. The slider 48 is bonded to the tip of the flexure 60. The slider 48 is of a type including an integrated MR read sensor 65 and an inductive write transducer 66 (read sensor and write transducer are depicted with dotted lines schematically only for the purpose of exemplification; the actual sizes and positions of these components differ from those seen here, but such a difference does not affect the understanding of the present invention). The mount plate 62 supports the end portion of leads 64. These leads are terminated at one end of the slider 48 and terminated also at the other end of the multiconnector 63 on the mount plate 62 to be electrically connected to the electronic circuit of the control unit 56 (cf. FIG. 1) through flex cables (not shown).

FIG. 10 exemplifies the slider region on the flexure 60 in more detail, The leads 64 are terminated on bonding pads 78 on the end surface of the slider 48, while a certain pair of leads 64 is electrically connected to an MR read sensor 65 and another pair of leads 64 is electrically connected to a write transducer 66. The termination of a lead is bonded to a slider pad 78 by an ordinary ultrasonic bonding process or the ultrasonic soldering. With smaller heat capacity due to the downsizing of individual pieces, however, the soldering using a solder ball or a gold ball is inconvenient in that an effect resulting from the received heat comes forth greatly. Thus, the fusion by ultrasonic waves is preferable because less heat is generated.

Here, in order that a plurality of leads 64 can be aligned with bonding pads on their flat surfaces for bonding, the bondable parts are bent at their ends. If exactly aligned, the leads 64 may be bent before or after the flexure 60 is mounted on the load beam 58 or in any other stage. As compared with the background art, the length of conductive leads are found to require only a necessary and sufficient distance. After the loading, an opening 80 in the load beam 58 or an opening 82 in the flexure 60 provides an access for forming the termination of a bent lead. Opening 80 and opening 82 also provide an access to the slider 48 so that the slider 48 can be retained firmly during the bonding (e.g., ultrasonic bonding operation) of a conductive lead to a bonding pad of the slider. The structure of various components or assemblies will be described below in detail.

Referring to (d) of FIG. 11, the load beam 58 is manufactured flat and strong. for example, of stainless steel or ceramic material. On describing an exemplified aspect, the load beam is about 0.04–0.05 mm thick. To execute a positioning response of the slider in the disk drive system 40 at high speed, is preferable to maintain the mass and the inertia of the load beam 58 at a possible minimum by using a thinner material without a compromise with the structural stiffness. To improve the torsion stiffness of a thin load beam 58, a stamping of surface feature onto the flat structure is made like a triangular hollow (depression) or a recess 68. As will be evident from the following description, this hollow 68 joins with the flexure 60 attached thereto, thereby forming a firmer box structure than a completely flat load beam 58. Furthermore, the edges along the length of the load beam 58 are curled to form flanges 70. These flanges 70 also enable a handling damage during the manufacturing process to be avoided and thus are convenient for the handling of the integrated suspension 50. Furthermore, the tab 72 or the tab-shaped extends from the end of the load beam 58 and facilitates the handling of the integrated suspension 50 during the assembly of the disk drive system 40. This tab 72 is also employed to load or unload (abbreviated to load/ unload or to L/UL in some cases) the slider 48 onto the disk 42. Like these, the contrivance to promote the stiffness is seen everywhere in the load beam 58.

The flexure 60 includes several layers made of different materials in the integrated structure. On referring to (a) to (c) of FIG. 11, various layers of the flexure 60 are shown as plan views in sequence of the top to the bottom (top-down sequence). The layered structure of the flexure 60 is a sheet of flexible materials (mentioned later as a spring layer 74), comprises stainless steel or other suitable spring materials and has such a thickness (18–20 microns (about 0.0005 mm) in the embodiment exemplified) as to give a desired elastic flexion. This is formed by the process of etching or stamping. The layer 76 of dielectric material (e.g., polyimde) is an intermediate layer separating a spring layer 74 and a layer of leads 64 (e.g., made of copper). These dielectric material layer and lead layer is formed using a well-known ordinary lithograph process.

The mount plate 62 may be manufactured of the same material as that of the spring layer 74 and is formed by the same process as that of the spring layer 74. It needs to be noted that the portion 84 of the leads 64 is positioned beyond the edge of the spring layer 74 (cf. FIG. 10). The portion 84 of these leads is maintained at several points 86 along this portion in spaced relation by a dielectric material (cf. FIGS. 12 and 13). This lead shape (lead layout) aims at the exclusion of a contact with the spring layer 74. As understood from the following discussion, the spring layer 74 is necessary for maintaining the elasticity for the gimbal support of the slider around the roll axis and the pitch axis.

The flexure 60 is structurized and mounted on the load beam 58 in a manner as to give a desired gimbal motion. In particular, the portion 88 of the spring layer 74 is firmly mounted to the load beam 58 by such means as, e.g., welding, riveting or epoxy resin. As mentioned above, the spring layer 74 of the flexure joins with the recess 68 on the load beam 58 to form a firm box-structure (cf. FIG. 12). The portion 90 of the flexure 60 has the slider 48 on it, but it is not fixedly (firmly and tightly) mounted on the load beam 58 but biased so as to be placed on or to lean on a gimbal pivot 92 on the load beam 58. The feature of the gimbal of the integrated suspension 50 will be more clearly described referring to FIG. 15.

In the slider region on which the spring layer 74 of the flexure 60 is placed, the gimbal pivot 92 is positioned on the load beam 58. In this gimbal pivot 92, the spring layer 74 on which the slider 48 is placed, is capable of elastically free pivot motion around the pitch (X) axis (depth direction of the paper) and the roll (Y) axis. This is because the spring layer 74 is not fixedly mounted on the load beam 58 in the portion 90. Since the flexure 60 has a flat laminate structure, its movement along the X axis is restricted. In order to restrict the range of a pitch and roll motion so as to prevent a damage to the flexure 60, restriction means 94 are given to the spring layer 74 of the flexure 60 and these extend through the opening 80 of the load beam 58. One or both of these restriction means 94 are so arranged as to be coupled with the edge 96 of the opening 80 and acts so that a pitch and/or roll motion does not exceed a designed range.

Ultrasonic Bonding Method of a Slider Suitable to the Structure of a New Integrated Suspension Assembly In the integrated suspension as described above, a superfine flexure is used as already described and there is a situation related to a new constitution that wires are integrally formed with the flexure. Besides, in conformity with this, there is a situation that a slider is also downsized. For this reason, the handling of this integrated suspension and the slider is compelled to be peculiar, that is, to dispense with the forming mentioned above and to maintain a mounting manner or a static attitude of the slider mentioned above, a special handling zoo becomes necessary. For this, such a delicate handling as to transform the flexure itself in the least possible degree becomes indispensable.

Especially in a structure having a high degree of freedom for the pivot support of the flexure on the load beam as mentioned above, this is likely to arouse a problem. This is because, in this gimbal pivot 92, the capability of elastically free pivot motion, especially around the pitch (X) axis (in depth direction of the paper), premises that the slider is mounted in an orderly attitude. To be more specific, because occurrence of a deformation in a pivot portion serving as a fulcrum would lead to a diffusion of angle errors or the like in the end of the flexure with the pivot portion employed as a fulcrum (origin). Thus, it is desired to minimize a deformation of the flexure in the manufacturing process.

In the present invention, to minimize such a deformation of the flexure in executing an ultrasonic bonding, it is desirable to adopt a method for supporting a part of the flexure close to the bonding pads on a platform support 100.

FIG. 16 shows the relation that the conductive leads 64 in a bent condition from the flexure before the ultrasonic bonding are aligned with the respective bonding pads 78 on the slider. (a) comprises a front view (left figure) and a side view (right figure) before the ultrasonic bonding and (b) comprises a front view (left figure) and a side view (right figure) after the ultrasonic bonding. In the ultrasonic bonding, ultrasonic waves driven in a length direction of the lead wires 34 causes the bonding tool 32 (cf. FIG. 5) to pull the conductive leads. Since the conductive leads are formed in a manner as to be integrated with the flexible member, pulling the conductive leads necessarily makes the flexible member to be bent (corresponding to a vertical motion as a motion around the pitch (X) axis) because the flexible member is a cantilever. In some condition of driving (such as setting angle of a bonding tool), it may occur that the flexure is pulled up conversely. Incidentally, the conditions enforced in the present invention are a lead diameter (width) of 50 $\mu$m, a pressurizing force of 75 gf, an ultrasonic frequency of 64 kHz, a supply time of ultrasonic waves of 150 msec Ref and a collapse amount of leads of 5 $\mu$m.

Like this, since the driving direction corresponds to the direction of a vertical motion of the flexure, a flexion is easily generated to the flexure (or flexible member). That is, this is because, when the conductive leads are pulled by a vibration, the flexible member integrally formed through the root of the conductive leads is pulled and consequently ended by being bonded in a bent state. Furthermore, if there is a gap between the conductive leads 64 and the bonding pads 78 (exaggerated in (a) of FIG. 16) a bonding finishes with the flexure 60 remaining bent (shown in (b) of FIG. 16). Thus, in the ultrasonic bonding, such a support as to restrict a vertical motion of the flexure becomes extremely important. Incidentally, since the slider 48 can be firmly retained through the opening 80 of the load beam 58 and through the opening 82 of the flexure 60 during the bonding, a vertical motion of the slider 48 itself can be directly restricted.

As mentioned above, this new suspension structure has the advantage that only a necessary and sufficient smaller distance of conductive leads is needed as its length than that of the background art, but on the other hand, has a demerit also that an influence of leaving the flexure flexed due to a lack of slack is likely to appear. In such a manner, once the slider ends in being fixed with a flexed condition left, it is very difficult to correct this condition in a later process. This is because a thin flexure, a small-sized slider and a small bonding portion leads the forming operation to a very fine operation.

On the other hand, as shown in FIG. 17, if the flexure is supported by the platform support 100 in the ultrasonic bonding, a deformation of the flexure can be minimized. It is preferable in minimizing the flexion to support the flexure by holding a part of the flexure possible closest to the part related to the bonding. Accordingly, an expression of "close to" is adopted with the intention incorporated. Thus, "close to" does not signify a extremely narrow range, but should be interpreted to include a sufficient range for the restriction of a deformation as technical scope of the present invention. In FIG. 17, the flexure 60 are supported at such two points on both ends as to place four conductive leads and four bonding pads between them. Points of support, number of supports and a method of support may be variously considered within the technical scope of the present invention.

The sequence of ultrasonic bonding is also important for the restriction of a flexion. This is because it is effective in taking a full advantage of "close to" support on a platform support to performing a bonding in close order of distance to a smallest flexible or highest stiff part. This is because, once bonding of a certain part finishes, a stiffness is obtained in this part as means for restricting a vertical motion, serving as a support for the next prearranged part for bonding. In a super-thin flexure as adopted in the present invention, this sequence of bonding becomes even more important.

Numerals "1432" in FIG. 17 show the sequence of ultrasonic bonding. If distances from the support part on the platform support differ little, the sequence of "1" and "2" may be reversed and the that of "4" and "3", may be reversed. That is, the sequences of "1342", "2341" and "2431" may be adopted, but in the sequence of "1342" or "2431", one bonding part must be skipped over in the process of "2", to "3" and accordingly such consequences would not be adopted when a quick positioning or an efficiency is required. (a) and (b) of FIG. 17 are front views of bonding parts before and after the ultrasonic bonding, respectively. Comparison of these reveals that a fault of a change in positional relation as observed in (a) and (b) of FIG. 16 is unlikely to occur.

Changing the viewpoint, a consideration will be made also from the viewpoint of the wire forming described above. We stated that according to the bonding method of the present invention, the conductive leads have only to be exposed as the bondable part by a possible minimum length from the integrated flexure. If an ultrasonic bonding is executed in such a situation, it is expectable that "self"-forming is performed.

The self-forming means that a part of conductive leads is plastically deformed as a result of ultrasonic bonding. Even if no alignment of conductive leads with bonding pads corresponding thereto is accomplished with good accuracy, it is expectable in some cases that deformations are equalized by this self-forming. In other cases, through a uniform occurrence of a permanent deformation at a specific part in a definite manner, an effect similar to the forming described in the background art can be obtained. Also from the viewpoint of an attempt to cause such a deformation to a full extent, it is preferable that the flexure is firmly supported. This is because if the flexure is easily flexed, a permanent deformation is not only difficult in taking place, but a variations in permanent deformation also increase together with variations in flexion generated on the flexure.

Then, it will be considered how to position the face of a bonding tool 32 (cf. FIG. 5) to the bonding pads 78 and the conductive leads 64. FIG. 21 shows a face 200 against which to hold the conductive leads 64, the bonding pads 78 and the bonding tool 32 (cf. FIG. 5). The face which the bonding tool can be held against is designated with a black part, and the point is how this area capable of being held against is utilized as a bondable area. If the face to which an ultrasonic bonding is performed extends over as wide an area as possible, the reliability of an electric connection is high and the contact area increase, thereby securing the stability. Thus, the situations of (a) and (c) are better than those of (b) and (d). Next, from the standpoint of positioning of the bonding tool, the situation of (a) is easier in execution than that of (c). This is because if the remotest edge of a bonding pad 78 from the flexure 60 is utilized for the edge of a bonding tool 32 (corresponding to the edge of a bondable area), all the wider access space is taken for lack of a protruding obstacle such as flexure 60 and accordingly the positioning is easier to perform. Besides, experimentally, ultrasonic bonding of four places was performed as shown in FIG. 17 and as a result of a statistical analysis on variations of their bonding conditions, the variation of bonding conditions can be minimized when an ultrasonic bonding is performed in the situation of (a). This results in the stabilization of a mounting manner and a static attitude.

Method Not Only for Fixedly Supporting an Integrated Suspension Assembly Structure in the Bonding of a Slider but Also for Releasing the Fixed Support As understood from FIG. 18, the integrated suspension assembly has a load beam 58 permanently bent at a predetermined part between the flexure 60 and the mount plate 62 with a predetermined angle. This bent situation is expressed in terms of a broken line in FIG. 18 and in terms of a virtual line in FIG. 19. This predetermined angle is, for example, 90°. The reason for such bending is to generate a load force (referred to as gram load also) for giving an elastic spring action that biases a slider toward a disk surface so as to balance the load force with a floating force due to a rotating slider on the magnetic disk surface. Besides, this load force also acts as a protrusion for the fixed retention of the tab 72 mentioned above unloaded from the disk surface onto the ramp. That is, the tab plays an important role in so-called load/unload (L/U).

In FIG. 18, 19° as a predetermined angle is measured relative to, e.g., a plane formed by the mount plate 62. In other words, no transformation occurs with a different angle from this 19° unless any external force is applied.

In the present invention, this tab shall be used also in the bonding of a slider. In the process of ultrasonic bonding, if some angle is left between the mount plate 62 and the flexure 60, the accommodation to a fitting jig is bad and the handling is inconvenient. Besides, since it is doubtful whether the very angle of 19° formed by a permanent deformation is formed within a reliable tolerance on earth, the plane of the mount plate 62 is not reliable as a reference plane. Thus, if a part of the flexure 60 is pressed down by an external force against its load force to be accommodated in a jig having the standard of any different angle from 19°, such angular errors need not be considered. In practice, as shown in FIG. 18, it would be the easiest to press down the flexure 60 and the mount plate 62 in parallel. Here, the different angle from a predetermined angle becomes substantially 0°.

As a method for exerting an external force, various methods are considered, but for example, if an external force is applied in accordance with the arrow daubed with black in FIG. 18 or FIG. 19 for the press-down, the flexure can be transformed. Besides, if that external force continues to be exerted, the transformation is maintained.

During the process of slider bonding, such a deformation situation should be maintained for the alignment of a slider with the bonding pads. However, once the bonding is completed, the integrated suspension assembly to which the slider was bonded must be released from the jig. When action of the external force is stopped, a restoring force serving to restore the planarized situation to the original situation of making an angle is generated. At this time, by temporarily supporting the part of the tab 72, the load force released from the transformation can be partially caught by the part of the tab 27. If the integrated suspension assembly is supported at the part 300 of dotted lines in FIG. 20, the whole body including a bent part will be restored in the direction of the blanked arrow (returns to the one having the original angle indicated with a virtual line). As a portion for catching the reaction force, the portion 400 of dotted lines, for example, has only to be supported. At this time, care is taken not to support the flexure. The reason for such partial catching of the released load force is to maintain a mounting manner and a static attitude of the slider by keeping the least possible amount of excessive flexion or transformation imposed on the part of the flexure. This is because some degree of transformation applied to the tab causes no obstacle whereas precision is required in a mounting manner and a static attitude of the slider. A more specific reason is that the torsion stiffness of the load beam is improved and enhanced with the contrivance of a shape, a box structure and suchlike, thereby securing a structure durable even to repeated load/unload operations.

For such a special suspension structure as the new integrated suspension assembly of the present invention, ultrasonic bonding of a slider can be appropriately performed.

By making the best use of characteristics of this special suspension structure, the retention and release of its transformation is performed appropriately.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for performing ultrasonic bonding to a suspension assembly so as to electrically connect a plurality of conductive leads and a plurality of bonding pads of a slider, the conductive leads being formed from an integral layer of the suspension, said suspension assembly comprising a load beam, a flexible member and the conductive leads integrally formed thereon, the load beam having a mount section at a first end, and an end tab at a second end, and a spring section angular bend located between the first and second ends, comprising the steps of:

applying a first external force to the mount section and a second external force to the end tab of the load beam such that the spring section angular bend equals approximately zero degrees and restraining the load beam at said zero degree position;

positioning bondable parts of said conductive leads to said bonding pads of said slider corresponding to said conductive leads, the conductive leads being planar members which are positioned parallel to the surface of the bonding pads;

supporting a part of said flexure close to said bondable parts of said conductive leads so as to restrict a vertical motion of said flexure;

supporting said slider between two removable support members, the support members each located proximate to a lateral side of the slider; and performing ultrasonic bonding between said conductive leads and said bonding pads, by first bonding the outer most of said bonding pads which are located proximate to the support members and then bonding the inner most of said bonding pads.

2. A method as set forth in claim 1, wherein said step of positioning has a step of fixedly attaching said slider to said flexure.

3. A method as set forth in claim 1, further comprising:

a step of bending the bondable parts of said conductive leads from said flexure so as to be substantially parallel to said bonding pads of said slider corresponding to said conductive leads prior to said step of positioning.

4. A method as set forth in claim 3, wherein said step of bending the bondable parts of said conductive leads from said flexure uses openings provided to said flexible member as accessible spaces.

5. A method as set forth in claim 1, wherein the number of said conductive leads is four and the number of bonding pads corresponding to these is four, both ends of said part of flexure are supported at two parts for holding all these conductive leads and all these bonding pads therebetween and ultrasonic bonding between said bondable parts of said conductive leads and said bonding pads is performed in close order of distance to any of said two supported parts.

* * * * *